United States Patent [19]

Macklin et al.

[11] Patent Number: 4,504,955
[45] Date of Patent: Mar. 12, 1985

[54] LOW VOLTAGE OPERATION OF ARC DISCHARGE DEVICES

[75] Inventors: John J. Macklin, Highlands; William T. Silfvast, Holmdel; Obert R. Wood, II, Little Silver, all of N.J.

[73] Assignee: AT&T Bell Laboratories, Murray Hill, N.J.

[21] Appl. No.: 408,006

[22] Filed: Aug. 13, 1982

[51] Int. Cl.³ .............................................. H01S 3/097
[52] U.S. Cl. ...................................... 372/76; 313/564; 313/565; 313/566; 372/56; 372/81; 372/87
[58] Field of Search ....................... 372/76, 56, 81, 87, 372/62; 313/564, 566, 565

[56] References Cited

U.S. PATENT DOCUMENTS

| | | | |
|---|---|---|---|
| 3,274,427 | 9/1966 | Paquette et al. | 313/566 |
| 3,465,205 | 9/1969 | Lafferty | 313/566 |
| 3,891,941 | 6/1975 | Roberts et al. | 372/77 |
| 4,295,103 | 10/1981 | Ljudmirsky | 372/82 |
| 4,336,506 | 6/1982 | Silfvast et al. | 372/62 |
| 4,388,720 | 6/1983 | Silfvast et al. | 372/82 |
| 4,395,770 | 7/1983 | Silfvast et al. | 372/62 |
| 4,411,733 | 10/1983 | Macklin et al. | 372/62 |

OTHER PUBLICATIONS

Silfvast et al., "Simple Metal-Vapor Recombination Laser...", *App. Phys. Letts.*, vol. 36, No. 8, pp. 615-617, Apr. 1980.

Silfvast et al., "Isoelectronic Scaling of Recombination Lasers...", *App. Phys. Letts.*, vol. 39, No. 3, Aug. 1981, pp. 212-214.

Silfvast et al., "Recombination Laser...", *Optics Letts.*, vol. 7, No. 1, Jan. 1982, pp. 34-36.

Llewellyn-Jones, "6.2 Very Short Gaps", *Ionization and Breakdown in Gases*, John Wiley & Sons Inc. New York, NY pp. 100-103.

Somerville, "1.1 Establishing an Arc Discharge" and 5.2 The Very Short Arc, *The Electric Arc*, John Wiley & Sons Inc., New York, NY pp. 1-5 and 130-131.

Primary Examiner—James W. Davie
Attorney, Agent, or Firm—Michael J. Urbano

[57] ABSTRACT

In an arc discharge device, a thin film bridges the gap(s) between adjacent electrodes, thereby enabling the arc discharge to be initiated and sustained by a low voltage D.C. supply. Application of the invention to both light source (e.g., laser) and material working (e.g., metal deposition) embodiments is described. One of the light source embodiments utilizes a cathode electrode which includes a pool of liquid Hg to generate a Hg ion plasma.

19 Claims, 5 Drawing Figures

LOW VOLTAGE OPERATION OF ARC DISCHARGE DEVICES

BACKGROUND OF THE INVENTION

This invention relates to arc discharge devices such as segmented plasma excitation and recombination (SPER) devices and, in particular, to low voltage arc formation between adjacent electrodes of such devices.

In Applied Physics Letters, Vol. 36, No. 8, pages 615-617 (1980), W. T. Silfvast, L. H. Szeto and O. R. Wood II describe a new electric discharge device developed for producing laser action in the atomic spectra of a number of metal vapors by a segmented plasma excitation and recombination (SPER) mechanism. This laser includes a number of narrow metal strips (of the lasing species) positioned end-to-end on an insulating substrate in such a way as to leave a small gap between each pair of adjacent strips. The strips are surrounded by either a buffer gas (preferably) or a vacuum and typically are 1 mm thick, 2 mm wide, and 10 mm long (hereinafter "bulk electrodes"). When a high-voltage, high-current pulse is applied to the end strips of this arrangement, a high-density metal-vapor ion plasma is formed in each gap. Once formed, these plasmas (consisting primarily of vaporized strip material) expand essentially hemispherically into a laser cavity, cool in the presence of the background gas (e.g., helium) at low pressure and recombine. Using this laser configuration, pulsed laser action was observed in the near infrared at more than 70 wavelengths between 0.29 and 3.95 μm in 11 elements (Ag, Bi, C, Ca, Cd, Cu, In, Mg, Pb, Sn, Zn), three of which (Mg, Zn, In) had not been observed to exhibit laser action in their neutral spectrum before. Some of these results are reported in the aforementioned APL article; others are reported by W. T. Silfvast, et al in *Applied Physics Letters*, Vol. 39, No. 3, page 212 (1981) and in *Optics Letters*, Vol. 7, No. 1, page 34 (1982).

The SPER laser is simple to construct, can be easily scaled in length and volume, has been shown to be capable of long life, and has the potential for high efficiency. It is the subject matter of U.S. Pat. No. 4,336,506 issued on June 22, 1981 and copending application Ser. No. 367,092, filed on Apr. 9, 1982 (now U.S. Pat. No. 4,395,770 issued on July 26, 1983). Both the patent and the application are assigned to the assignee hereof.

Lasing action in a SPER laser is not observed with equal facility with all metals, even at high pressure of the background gas. A figure of merit, $M$ ($0 < M \leq 1$), can be derived which defines the relative ease of achieving lasing action in a metal vapor. $M$ is defined as follows:

$$M = 1/kc\rho T^2 \tag{1}$$

where $k$ is the thermal conductivity of the metal, $c$ is the specific heat of the metal, $\rho$ is the density of the metal, and $T$ is the temperature of the surface of the metal electrode at which the vapor pressure of the metal is conducive to arc formation (~0.1 Torr). Experimentally, metals with $M \sim 1$, such as Cd and Na, have been found to easily produce the segmented metal vapor plasmas that are necessary for lasing action in SPER lasers at low background gas pressures (e.g., 1-10 Torr), whereas metals with $M << 1$, such as Li, Al, Ca, and Cu, do not even produce segmented plasmas at such low pressures. With these metals as the background pressure is reduced, the discharge current is carried by a discharge in the background gas between non-adjacent electrodes, effectively bypassing the intervening metal vapor arcs, reducing the number of metal vapor plasmas and, hence, lowering the net gain.

In another copending application Ser. No. 367,216 also filed on Apr. 9, 1982 (now U.S. Pat. No. 4,441,189 issued Apr. 3, 1984) and assigned to the assignee hereof, we describe how segmented metal vapor plasma discharges and pulsed lasing action in SPER devices can be achieved, even at relatively low background gas pressures, with metal electrodes of materials having $M << 1$ provided that the metal strips constitute foil electrodes. These electrodes are sufficiently thinner (typically about 10 times thinner) than bulk electrodes so that discharges occur only between adjacent electrodes, thereby eliminating the short circuiting problem associated with bulk electrodes. Using this foil electrode SPER configuration, we have achieved pulsed laser action in four metals (Li, Al, Ca, and Cu) in which laser oscillation was not possible using bulk electrodes and lower pressures. As a result, we observed recombination laser action on 30 transitions with oscillating wavelengths ranging from 569.6 nm to 5460 nm. Twenty-eight of these transitions had not previously been made to undergo laser oscillation by any excitation means. In addition, we observed segmented vapor plasma discharges in a SPER device with Ni foil electrodes.

In the above-described work the SPER lasers were operated in a pulsed mode; that is, the excitation means applied a relatively short duration (e.g., 5 μsec) electrical pulse. Significantly longer duration electrical signals suitable for continuous wave operation would have generated excessive heat in the electrodes, ultimately causing them to melt. Had the electrodes been so damaged, of course, laser operation would no longer have been possible. However, another of our copending applications, Ser. No. 389,779 filed on June 18, 1982, describes continuous wave operation of a SPER laser in which the pump signal is suitable for continuous wave operation and means are provided for flowing a background gas across the electrodes. Using this laser configuration with Cd strips, continuous wave laser action has been observed for the first time in a metal vapor arc discharge plasma. Laser action occurred in the Cd vapor at 1.40, 1.43, 1.44, and 1.64 μm, as the Cd+ ions recombined in the presence of a flowing He background gas. Typical input powers of 3-4 A at 20 V produced a measured power output of 0.5 mW, although the laser was believed to be operating near threshold and significantly higher powers should be possible. This technique is applicable to the wide range of visible and infrared recombination laser transitions already achieved in pulsed metal vapor arc plasmas.

As the acronym SPER indicates, this family of devices relies primarily on a recombination mechanism to generate light, whether via spontaneous or stimulated emission. That is, electrons in the plasma collide with ground state atoms of the vaporized electrode material, thereby generating ions. Upon cooling of the plasma, those ions recombine with electrons, thereby generating excited ions (in lower ion stages) and atoms. Transitions between energy lines in these atoms and ions result in light emission.

This recombination mechanism is dominant at relatively low pressures of the background gas (e.g., 1–10 Torr), but at higher pressures (e.g., 40 Torr) hot electrons tend to excite atoms directly into the energy levels from which they radiate. The latter mechanism, known as electron-impact excitation, takes place concurrently with recombination, but the two may be either temporally or spatially separate. For example, recombination radiation tends to be delayed relative to radiation due to electron-impact, and recombination tends to occur farther from the electrode gap (in the expanding plasma) whereas electron-impact light tends to be emitted from a region fairly close to the gap. As discussed hereinafter, a segmented plasma electron-impact device, modified in accordance with our invention, may find application as a UV source to erase EPROMs (Erasable Programmable Read Only Memory).

In contrast with the foregoing light source applications of segmented plasma arc discharge devices, we have also discovered that these devices can be utilized to form layers on a workpiece or to etch layers from a workpiece. These material working techniques, which are described in our copending application Ser. No. 389,780, filed on June 18, 1982 (now U.S. Pat. No. 4,411,733 issued Oct. 25, 1983), entail providing an aperture in the gap between adjacent electrodes and flowing background gas through the gap. The flowing gas causes the ion plasma to take the shape of a beam which strikes the workpiece, thereby depositing a layer thereon or etching a layer therefrom depending on the specific operating conditions.

The excitation means utilized in both the light source and material working segmented plasma arc discharge apparatus typically includes a high voltage supply and a low voltage supply connected in parallel. The high and low voltages are applied sequentially to the device. Illustratively, the high voltage (a few kilovolts) serves to breakdown the gaps between adjacent electrodes. Thereafter, the low voltage (20 V D.C. at a few amperes) serves to sustain the arc discharge (i.e., the plasma).

SUMMARY OF THE INVENTION

We have found that arc discharge devices can be operated without the need for a high voltage supply to break-down the gap(s). In accordance with an illustrative embodiment of our invention, at least one thin film bridges the gap(s) between adjacent electrodes, and a low voltage supply alone is sufficient to generate the plasma and to sustain operation. For example, 20–30 V batteries have been used to operate SPER lasers.

BRIEF DESCRIPTION OF THE DRAWING

Our invention, together with its various features and advantages, can be readily understood from the following, more detailed description taken in conjunction with the accompanying drawing in which, for clarity of illustration, the figures are not drawn to scale.

DETAILED DESCRIPTION

Figure 1:
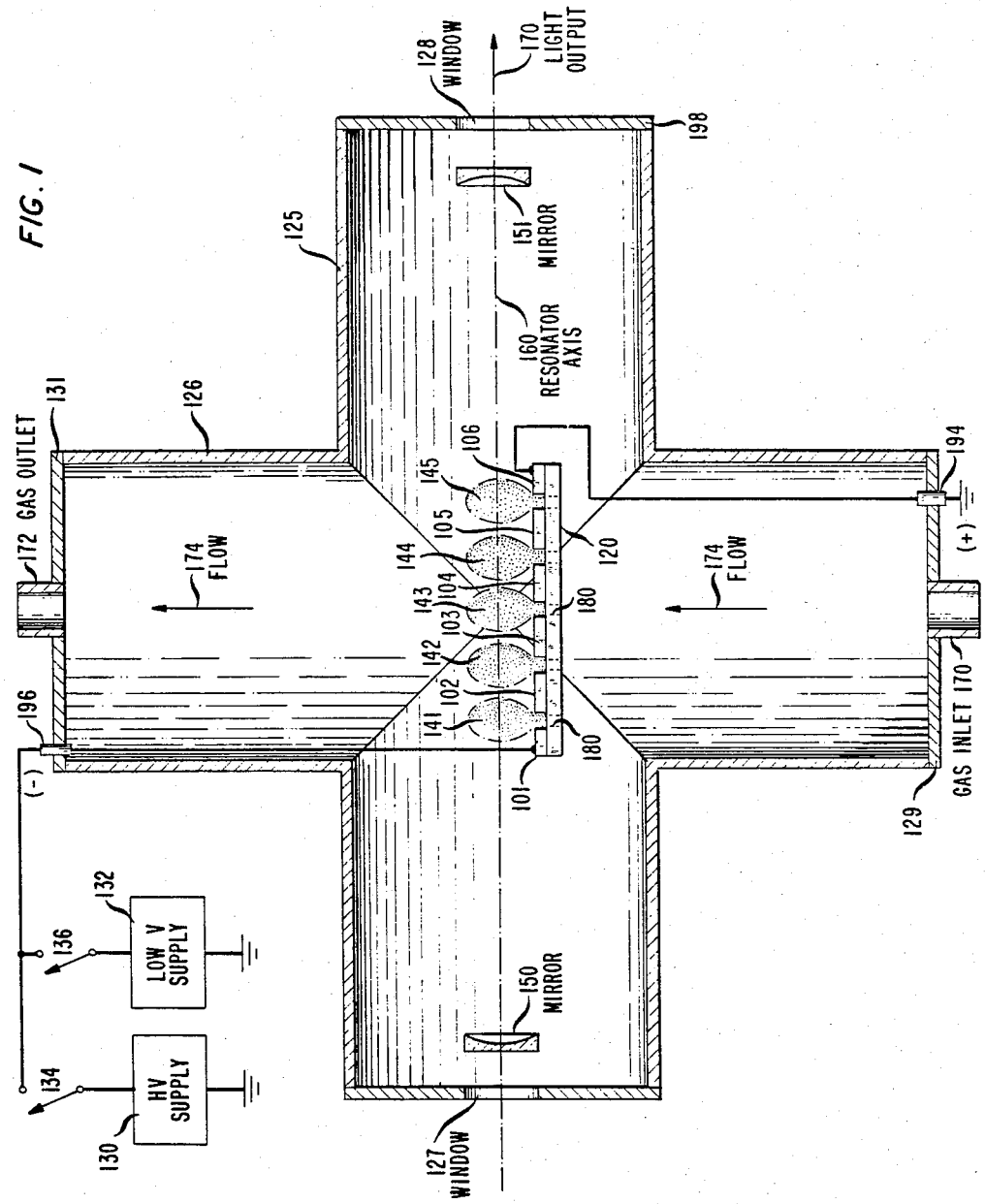
FIG. 1 is a schematic of an illustrative embodiment of a continuous wave SPER laser which is exemplary of the configuration of SPER devices in general.

Apparatus used for continuous wave or pulsed operation of a SPER laser in a metal vapor is shown in FIG. 1. A plurality of strip electrodes 101–106 are positioned in tandem on an electrically insulating substrate 120 in such a manner as to leave a small gap between each pair of adjacent strips. This electrode arrangement is then installed in a pyrex cross-shaped gas cell comprising a longitudinal glass tube 125 and a transverse glass tube 126. In our earlier experiments, a high voltage supply 130 and a low voltage supply 132 are connectable in series across the first (101) and last (106) electrodes via switches 134 and 136, respectively. The high voltage supply, which typically provides a high voltage pulse (e.g., a few kV) to break-down the gaps, is no longer necessary to the operation of SPER devices as discussed hereinafter. After break-down initiates the discharge, low voltage supply 132 provides a lower voltage (e.g., 20 V D.C.) signal suitable for continuous wave or pulsed operation. In general, a signal which is longer in duration than a few milliseconds would be suitable for continuous wave operation. For operation longer than about 1 sec, well-known cooling means (not shown) should be incorporated to prevent the electrodes from overheating and melting. This excitation produces a bright vapor plasma of electrode material in each gap. Areas 141–145 in FIG. 1 depict the shape of the plasmas after they have expanded essentially hemispherically outward from the gaps into a background gas.

The entirety of each strip need not constitute a material (e.g., a metal) which is vaporizable into a plasma. As described in our copending applications (Ser. Nos. 367,092 and 367,216, it is sufficient if the cathode ends constitute such a material and that the anode ends constitute a nonvaporizable material under the operating condition of the device. Moreover, strips of different vaporizable materials can be mixed within a single device so as to yield a multi-color source.

Two dielectric spherical mirrors 150 and 151 are coated for maximum reflectivity at the desired lasing wavelength to form a resonator for the laser radiation. Illustratively, these mirrors are mounted near the ends of longitudinal tube 125 which contain windows 127 and 128. The optical axis 160 of this resonator is positioned parallel to and slightly above the row of electrodes. The output from this resonator, shown as arrow 170, is focused through suitable filters onto a suitable photodetector (not shown).

Insulating substrate 120 is not essential to operation of the laser. In fact, substrate 120 can be eliminated without significantly affecting the laser output. It does, however, function as a structural support for the electrodes and can control the direction of plasma expansion to some extent. Illustratively, substrate 120 is mounted on a rod (not shown) which is translatably mounted through end plate 129 at one end of transverse tube 126 so as to allow positioning of the electrodes relative to axis 160.

A gas inlet 170 and a gas outlet 172 are provided in end plates 129 and 131, respectively, at opposite ends of transverse tube 126. For continuous wave operation, background gas, such as helium, is coupled from a source (not shown) through inlet 170 and is made to flow relatively rapidly (e.g., 500 l/min) across electrodes 101-106 to outlet 172 and then to a gas pump (not shown). For pulsed operation, gas flow across the electrodes is not necessary. For continuous wave operation gas flow is necessary and serves to move the ions in the plasma away from the arc discharges in the regions of the gaps and to cool the plasma. Arrows 174 show an illustrative direction of gas flow (e.g., transverse to resonator axis 160) which acts to cool the electrodes and allows for continuous wave operation. To this end, the gas flow should at least be in the vicinity of the gaps.

To enhance this effect it may be desirable to provide apertures 180 (e.g., slots) in substrate 120 between the electrodes; i.e., in the gaps. Background gas would thus flow not only around substrate 120 but also through it, thereby increasing the cooling interaction of the gas and the electrodes.

When a pin-hole-like aperture is employed in the gap between a pair of adjacent electrodes of a SPER device, and the background gas is piped through the aperture, the plasma takes the shape of a beam. As discussed in our copending application Ser. No. 389,780 filed on June 18, 1982, the beam can be made to strike a workpiece placed downstream of a SPER device, thereby forming a layer on or etching a layer from the workpiece, depending on the operating conditions of the device.

Figure 2:
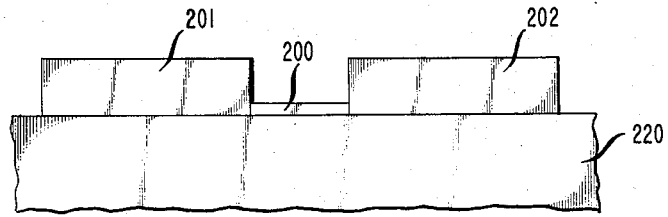
FIG. 2 is a schematic of a SPER device with a thin film deposited in the gap between a pair of electrodes in accordance with one embodiment of our invention.
Figure 3:
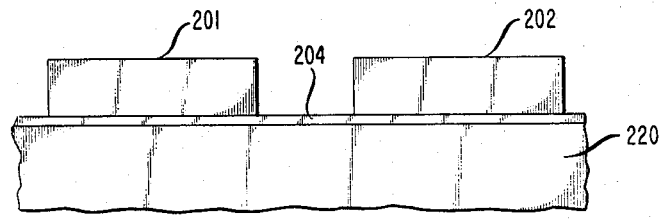
FIG. 3 is a schematic of another embodiment of our invention in which a pair of electrodes are placed on top of the thin film which bridges the gap between them.

In accordance with our present invention, the need for the high voltage supply to break down the gap(s) of an arc discharge device is obviated by providing at least one thin film, illustratively metallic, which bridges the gap(s) between adjacent electrodes. Illustratively, each film is only a few micrometers thick (e.g., $<10$ $\mu$m) and preferably has a resistance in the range about $5\Omega$ to $1000\Omega$, which is higher than the dynamic impedance of the arc between adjacent electrodes once the arc is established. Typically, the gaps are 1-3 mm wide and the background gas is He at about 5 Torr. As depicted in FIG. 2, a thin film 200 may be formed on the substrate 220 in the gap between adjacent electrodes 201 and 202. In this case, the electrodes are in contact with the substrate. Alternatively, as shown in FIG. 3, a thin film 204 may be formed to cover a larger area of substrate 220, and then separated electrodes 201 and 202 may be placed thereon.

The thin films 200 or 204 may be formed by any of numerous well-known processing techniques (e.g., evaporation, sputtering) or by the metal deposition technique described in our copending application Ser. No. 389,780, supra. In addition, for the embodiment of FIG. 2, we have used a short duration, high voltage pulse from high voltage supply 130 (FIG. 1) to evaporate material from electrode 201 (primarily). The evaporated material deposits itself as thin film 200. Note, the high voltage supply 130 is used only to form the film 200. Thereafter, the plasma is initiated and operation sustained with excitation provided only by low voltage supply 132.

The following examples are provided by way of illustration only. Device parameters and operating conditions, unless otherwise stated, are not intended to limit the scope of the invention.

EXAMPLE I

This example describes the application of our invention to the initiation of an arc discharge between a pair of Cd electrodes at low breakdown voltages (about 30 V). As shown in FIG. 2, these electrodes 201 and 202 were 10 mm diameter hemispherical rods which were 8.2 mm long, and were separated by a gap of approximately 1.5 mm, and were mounted on an $Al_2O_3$ substrate 220. Although not shown in the drawing, the facing ends of the two electrodes were tapered toward one another. The background gas was He at a pressure of about 5 Torr.

In order to form the thin film 200 which bridges the electrodes 201 and 202, the high voltage supply 130 of FIG. 1 was employed to generate an arc discharge between the electrodes. Illustratively, the high voltage supply provided 10 kV through a 3.5 $\mu$F capacitor connected to ground and a 300$\Omega$ resistor and spark gap connected in series with the electrodes 201 and 202. The current pulses from supply 130 evaporated Cd from the electrodes 201 and 202. A large fraction of the evaporated Cd was deposited on the surface of substrate 220 as a thin film 200 between the electrodes 201 and 202. This Cd film 200 was in electrical contact with the Cd electrodes 201 and 202.

After typically 5-20 current pulses the high voltage supply 130 was removed (switch 134 was opened), and the arc discharge was subsequently established using only the low voltage D.C. supply 132 with an output voltage of approximately 30 V applied for as short a time as 1 msec.

Although these observations occurred in a He gas of 5 Torr, similar low voltage breakdown occurred at higher and lower pressures in the observed range of 0.25-80 Torr.

The low voltage breakdown of the gap between electrodes 201 and 202 depends on the characteristics of the Cd film 200. It has been observed to occur when the resistance between the electrodes was approximately 5-1000$\Omega$ as measured when the power was off.

From a theoretical standpoint, the lower voltage breakdown of the gap between electrodes 201 and 202 is believed to occur by the following mechanism. Initially, with the application of the low voltage pulse of about 30 V, current is established between the electrodes in the Cd film 200, and a voltage exists across the electrodes 201 and 202. Because the Cd film 200 is relatively thin ($\lesssim 10$ $\mu$m), joule heating rapidly produces Cd vapor and electrons, resulting in Cd ions and additional electrons between the electrodes. These species provide between the electrodes a conducting filament which carries an increasing fraction of the current. Additional heating of the film due to increased current flow increases the conductivity of the filament so that the impedance of the filament drops below that of Cd film 200. The majority of the current is then carried by the filament and results in the observed arc discharge.

It is believed that the lowest voltage for which an arc discharge may be formed depends on gap width and on the electrode material employed. For gaps of 1-3 mm and Cd electrodes, the lowest voltage necessary is $\sim 20$-25 V, which is in agreement with the experimental values of the voltage of 23-25 V.

EXAMPLE II

This example describes a pulsed Cd SPER laser operating at 1.433 $\mu$m. A 30 V transistor battery was utilized to initiate the arc discharge as described in Example I. The population inversion occurred in the Cd plasma as it expanded and recombined into a He background gas at a pressure of about 2–5 Torr. Laser action occurred during the decay of the input current pulse.

This SPER laser utilized a two electrode configuration (of the type shown in FIG. 2) which was substituted for the six electrode SPER device of FIG. 1. In addition, because only pulsed operation was utilized, the transverse flow 174 of the He gas was not necessary. In this experiment the 30 V transistor battery was utilized to charge a 500 $\mu$F capacitor through a 1 k$\Omega$ resistor. The charged capacitor was then discharged through the gap between electrodes 201 and 202 as previously described. As a result, an arc formed between the electrodes with a peak current of about 25 A, decaying to 1/e of that value in about 250 $\mu$sec. Laser action occurred during the decaying stage of the input current pulse after sufficient cooling of the expanding plasma had occurred. The laser pulse duration was about 200 $\mu$sec.

The laser action was observed for He pressures in the range of about 1.5–10 Torr with the optimum value depending upon the distance of the arc discharge from the axis 160 of the resonator. Peak output power was estimated to be less than 1 mW and probably greater than 0.1 mW. No attempt was made to optimize the output.

In nearly identical experiments, the input voltage was reduced to 22.5 volts under different operating pressures and distances d between the arc and the resonator axis. For example, this lower voltage operation was achieved at a pressure of 2.5 Torr with d=10 mm and at a pressure of 3.5 Torr and d=7.5 mm.

EXAMPLE III

In this experiment we measured the contact resistance and the thin film resistance of a SPER device of the type shown in FIG. 2. As described in Example I, both the electrodes and the thin film were made of Cd. We found that the Cd thin film 200 had a thin film resistance of 0.75$\Omega$. We measured no contact resistance between the anode electrode 202 and the thin film 200, but we measured a 3.5$\Omega$ contact resistance between the cathode electrode 201 and the thin film 200.

EXAMPLE IV

In this experiment we utilized a glass substrate on which we mounted three Cd electrodes each measuring 0.75 in. long by 3 mm wide by 1 mm thick. They were separated from one another by 1 mm gaps so that two gap regions were defined. After the application of 50 current pulses each 0.3 seconds long from a 80 V D.C. supply, suitable thin films were deposited in the gaps. That is, we were able to generate an arc discharge across the gaps utilizing a 45 V battery. The resistance of the SPER device, as measured between the first and third electrodes, was found to be 2.5$\Omega$.

Contact to the first and third electrodes was made by aluminum foils placed between these electrodes and the substrate.

EXAMPLE V

In this example we plated a Cd film 204 on a glass substrate 220 as shown in FIG. 3. Cd electrodes 201 and 202 were then mounted on the film 204. However, in the actual experiment the thin film 204 did not extend completely under both electrodes. Rather, the thin film 204 extended part way under electrode, with the contact area under the cathode electrode 201 being larger than that under the anode electrode 202. The Cd film 204 had a thin film resistance of about 10$\Omega$ and a thickness less than about 1 $\mu$m. The resistance between the electrodes with power off was approximately 15$\Omega$. This SPER device generated a plasma arc discharge between the electrodes with the application of a pulse from a 30 V battery as previously described.

EXAMPLE VI

This experiment was similar to that described in Example V except that the cathode electrode 201 was made of Al and the anode electrode 202 was made of Cd. The thin film 204 was again made of Cd. This SPER device also generated a plasma arc discharged with the application of a voltage pulse from a 40 V D.C. supply. The plasma comprised a mixture of Al and Cd ions.

EXAMPLE VII

This experiment was also similar to that described in Example V except that the gap between the Cd electrodes was 1 cm instead of 1 mm. The application of at least 50 V D.C. resulted in two Cd plasmas, one near each electrode.

EXAMPLE VIII

This experiment was similar to that described in Example I except that two Al electrodes each 25 mm long by 3 mm wide by 1 mm thick were were separated by a 1 mm gap when mounted on a glass substrate, as shown on FIG. 2. The thin film 200 of Al was formed as described in Example I by the application of approximately 10 pulses each of 1 sec duration from the high voltage supply 130 (FIG. 1). Thereafter, the SPER device was capable of initiating an arc discharge from a 75 V D.C. supply.

EXAMPLE IX

Figure 4:
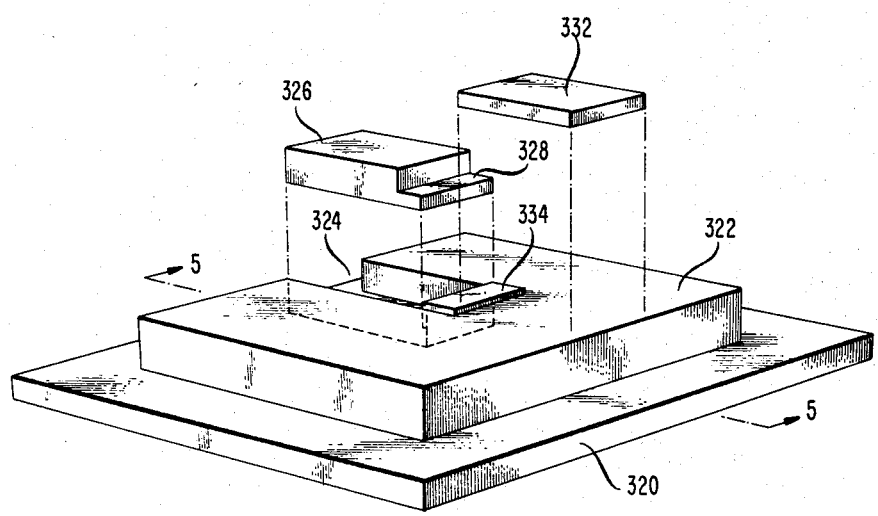
FIG. 4 is an isometric view of still another embodiment of our invention for incorporating a liquid metal as part of the cathode electrode.
Figure 5:
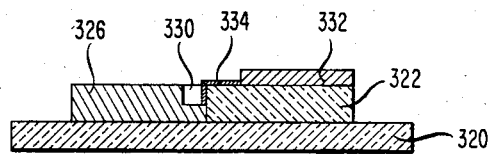
FIG. 5 is a cross-section taken along line 5—5 of FIG. 4.

This experiment describes the generation of low voltage arc discharge in a SPER device which includes a composite Cd-Hg cathode and a Cd anode mounted on a glass substrate. As shown in FIGS. 4 and 5, a glass block 322 was mounted on a glass substrate 320. The block 322 had cut therein a channel 324 which was adapted to receive a cathode electrode 326. A step 328 was formed at one end of cathode electrode 326 so that when the cathode 326 was placed in the channel 324, the step 328 formed a recess 330 into which the liquid Hg could be placed. (Alternative configurations for confining the liquid are, of course, possible, including for example forming a well in the cathode electrode 326.) The anode electrode 332 was mounted to the top of the glass block 322 in axial alignment with the cathode electrode 326 and spaced slightly from the recess 330.

Before the Hg was inserted in recess 330, this SPER device was processed as described in Example I in order to plate a Cd thin film 334 on the vertical and horizontal surfaces of the glass block 332 between the cathode and the anode, i.e., on the corner of block 332 at the closed end of channel 324. The thin film 334 enabled a plasma arc discharge to be struck at low voltages between the electrodes without the liquid Hg in the recess. Then, a pool of liquid Hg was placed in recess 330 making contact with the Cd cathode electrode 326 and the Cd thin film 334, but not with the Cd anode electrode 332. Utilizing this configuration on a background gas of He at 3 Torr, a plasma arc discharge was initiated and sustained utilizing a 22.5 V battery. The plasma was primarily Hg vapor which generated ultraviolet radiation primarily at a wavelength of 2537 A. The procedure was reproducible for only a few pulses but could be reproducibly operated after reprocessing from a D.C. power supply (e.g., 30 V pulses of 1 msec duration) or from two series connected 22.5 V batteries.

After this type of operation, we found that the Cd cathode electrode 326 was completely covered with Hg which could not be readily scraped off.

We expect that this embodiment of our invention, or versions similar to it, may be useful as a light source for erasing the memory of an EPROM.

EXAMPLE X

In the version described below we have demonstrated that a Si EPROM can be erased by a low voltage arc discharge device in accordance with our invention.

A closed quartz tube about 10 mm in diameter and about 4.5 in. long contained about 1 in. of Hg in the bottom and the remainder was filled with He gas at approximately 40 Torr. A tungsten wire, 50 mils in diameter, extended through the bottom of the tube into the Hg pool and served as a negative electrode. A copper strip extended through the top of the tube and served as a positive electrode. A quartz strip extended from the bottom of the copper strip into the Hg pool. By striking a high voltage arc, the quartz strip was coated with Hg, thereby providing a Hg thin film which bridged the gap between the Cu strip and Hg pool in accordance with our invention.

The EPROM was positioned outside the tube and adjacent the gap. About 12 V D.C. at 6A was applied between the Cu strip and W wire to create and sustain an arc discharge and thereby to generate UV radiation at 2537 Å from the Hg plasma in the gap. Because of the high He pressure employed, the UV radiation was generated primarily by electron-impact excitation rather than by recombination. After about 10 seconds of UV exposure, the EPROM was erased.

This experiment was not optimized and we expect that the erasure time can be reduced to a few seconds.

It is to be understood that the above-described arrangements are merely illustrative of the many possible specific embodiments which can be devised to represent application of the principles of the invention. Numerous and varied other arrangements can be devised in accordance with these principles by those skilled in the art without departing from the spirit and scope of the invention.

What is claimed is:

1. An arc discharge light source comprising:
   excitation means for producing radiation;
   said excitation means comprising at least two strips having at least one gap, which at least one gap provides at least one intervening discharge path; and means for applying an electrical signal to said at least two strips;
   at least a portion of said at least two strips being fabricated from a material which is converted into a plasma of ions as a result of the application of said electrical signal, which plasma generates said radiation; characterized in that
   at least one thin film bridges each of said at least one gap, thereby reducing the voltage of said signal required to initiate said plasma.

2. The light source of claim 1 further including an electrically insulating substrate on which said strips are mounted and wherein said at least one thin film is formed on said substrate and underlies at least a portion of said at least two strips.

3. The light source of claim 1 further including an electrically insulating substrate on which said strips are mounted and wherein said at least one thin film is formed in said at least one gap and in contact with each of said at least two strips.

4. The light source of claims 1, 2, or 3 wherein said thin film comprises a metal layer.

5. The light source of claim 4 wherein said thin film has a thickness of $\lesssim 10$ $\mu$m.

6. The light source of claims 1, 2, or 3 wherein the thickness and composition of said thin film allow said plasma to be initiated with a D.C. voltage of $\lesssim 75$ V.

7. The light source of claims 1, 2, or 3 for use as a laser furter including
   a resonant laser cavity which permits egress of laser radiation therefrom,
   said excitation means producing said radiation in said cavity, and a cell for containing a background gas and in which said at least two strips are located.

8. The source of claim 3 wherein
   one of said at least two strips has a recess therein,
   a liquid metal being contained in said recess,
   said thin film being in contact with said liquid metal and another of said at least two strips so that said plasma comprises ions of said liquid metal.

9. The source of claim 8 wherein
   said substrate has therein a channel with an interior end wall, said one strip is inserted in said channel and has a step at one end thereof which, together with said end wall, forms said recess,
   said other strip is mounted on said substrate adjacent said recess,
   said thin film connects said strips and is formed on at least said end wall, and
   said liquid metal is contained within said recess so that electrically it is part of said one strip.

10. The source of claim 8 wherein said liquid metal comprises Hg.

11. The source of claim 10 wherein said strips and said thin film comprise Cd.

12. The source of claims 1, 2, 3, 8, 9, 10, or 11 further including a cell for containing background gas and in which said at least two strips are located.

13. The source of claim 12 wherein said gas comprises He at a pressure of about 1–40 Torr.

14. The source of claims 1, 2, 3, 8, 9, 10, or 11 wherein the resistance of the series combination of adjacent strips and said thin film formed in the gap therebetween is between approximately 5$\Omega$ and 1000$\Omega$.

15. An arc discharge device comprising:
    excitation means including at least two strips having at least one gap, which at least one gap provides at least one intervening discharge path; and means for applying an electrical signal to said at least two strips;
    at least a portion of said at least two strips being fabricated from a material which is converted into a plasma of ions as a result of the application of said electrical signal; characterized in that
    at least one thin film bridges each of said at least one gap, thereby reducing the voltage of said signal required to initiate said plasma.

16. An arc discharge light source comprising a metal strip,
    a pool of liquid metal spaced in close proximity to one end of said strip so as to form a gap therebetween, said liquid metal being convertible into a plasma of ions as the result of the application of an electrical signal between said strip and said pool, which plasma generates radiation, and at least one thin film bridging said gap, thereby reducing the voltage of said signal required to initiate said plasma.

17. The source of claim 16 wherein said liquid metal comprises Hg.

18. The source of claim 17 wherein said thin film comprises Hg.

19. The source of claim 18 wherein said thin film is formed by applying a high voltage between said strip and said pool, with said pool being at a more negative voltage than said strip.

* * * * *